United States Patent
Ostman et al.

(10) Patent No.: US 8,340,160 B2
(45) Date of Patent: Dec. 25, 2012

(54) DYNAMIC COMBINING THRESHOLD FOR A RAKE RECEIVER

(75) Inventors: Kjell Isak Ostman, Halikko (FI); Jukka Tapio Vikstedt, Oulu (FI); Markku Tapani Kurtti, Oulu (FI)

(73) Assignee: Nokia Corporation, Espoo (FI)

( * ) Notice: Subject to any disclaimer, the term of this patent is extended or adjusted under 35 U.S.C. 154(b) by 815 days.

(21) Appl. No.: 12/395,651

(22) Filed: Feb. 28, 2009

(65) Prior Publication Data

US 2010/0040116 A1 Feb. 18, 2010

Related U.S. Application Data

(60) Provisional application No. 61/067,451, filed on Feb. 28, 2008.

(51) Int. Cl.
*H04B 1/00* (2006.01)

(52) U.S. Cl. ........ 375/148; 375/130; 375/141; 375/144; 375/146; 375/147; 375/220; 375/295; 375/316; 375/340; 375/346; 375/349; 455/39; 455/91; 455/296; 455/501; 370/320; 370/334; 370/335; 370/342; 370/343; 370/441; 370/479; 370/480; 327/551

(58) Field of Classification Search .................. 375/130, 375/141, 144, 146, 147, 148, 220, 295, 316, 375/340, 346, 349; 455/39, 91, 296, 501; 370/320, 334, 335, 342, 343, 441, 479, 480; 327/551
See application file for complete search history.

(56) References Cited

U.S. PATENT DOCUMENTS

| | | | |
|---|---|---|---|
| 6,215,814 B1 | 4/2001 | Ylitalo et al. | 375/148 |
| 6,741,665 B2 | 5/2004 | Kenney et al. | 375/344 |
| 7,245,652 B2 | 7/2007 | Wilson | 375/147 |
| 7,283,578 B2 | 10/2007 | Lin et al. | 375/130 |
| 7,386,030 B2* | 6/2008 | Asghar et al. | 375/142 |
| 7,480,516 B1* | 1/2009 | Chen et al. | 455/522 |
| 2004/0179584 A1 | 9/2004 | Bilgic et al. | |
| 2009/0113429 A1* | 4/2009 | Luschi et al. | 718/100 |

FOREIGN PATENT DOCUMENTS

| | | |
|---|---|---|
| CN | 1464638 A | 12/2003 |
| JP | 11234172 A | 8/1999 |

OTHER PUBLICATIONS

3GPP TS 25.211 V5.8.0, Dec. 2005, "$3^{rd}$ Generation Partnership Project; Technical Specification Group Radio Access Network Physical channels and mapping of transport channels onto physical channels (FDD) (Release 5)", 39 pgs.

3GPP TS 25.212 V5.10.0, Jun. 2005, "$3^{rd}$ Generation Partnership Project; Technical Specification Group Radio Access Network; Multiplexing and channel coding (FDD) (Release 5)", 72 pgs.

(Continued)

*Primary Examiner* — Leon Flores
(74) *Attorney, Agent, or Firm* — Harrington & Smith

(57) ABSTRACT

Described is a method that includes receiving a signal through a channel; considering at least one channel-related criterion and, in response to the considered at least one channel-related criterion, setting a value of an adaptive combining threshold for a maximum ratio combiner that receives the outputs of a plurality of fingers of a rake receiver.

18 Claims, 2 Drawing Sheets

OTHER PUBLICATIONS

3GPP TS 25.213 V5.6.0, Jun. 2005, "3$^{rd}$ Generation Partnership Project; Technical Specification Group Radio Access Network; Spreading and modulation (FDD) (Release 5)", 25 pgs.

3GPP TS 25.214 V5.11.0, Jun. 2005, "3$^{rd}$ Generation Partnership Project; Technical Specification Group Radio Access Network; Physical layer procedures (FDD) (Release 5)", 51 pgs.

3GPP TS 25.215 V5.7.0, Jun. 2005, 3$^{rd}$ Generation Partnership Project; Technical Specification Group Radio Access Network; Physical layer—Measurements (FDD) (Release 5), 17 pgs.

3GPP TS 25.221 V7.5.0, Nov. 2007, "3$^{rd}$ Generation Partnership Project; Technical Specification Group Radio Access Network; Physical channels and mapping of transport channels onto physical channels (TDD) (Release 7)", 192 pgs.

3GPP TS 25.222 V7.5.0, Nov. 2007, "3$^{rd}$ Generation Partnership Project; Technical Specification Group Radio Access Network; Multiplexing and channel coding (TDD) (Release 7)", 94 pgs.

3GPP TS 25.223 V7.6.0, Nov. 2007, "3$^{rd}$ Generation Partnership Project; Technical Specification Group Radio Access Network; Spreading and modulation (TDD) (Release 7)", 31 pgs.

3GPP TS 25.224 V7.5.0, Nov. 2007, "3$^{rd}$ Generation Partnership Project; Technical Specification Group Radio Access Network; Physical layer procedures (TDD) (Release 7)", 71 pgs.

\* cited by examiner

DYNAMIC COMBINING THRESHOLD FOR A RAKE RECEIVER

RELATED APPLICATIONS

This patent application claims priority under 35 U.S.C. '119(e) from Provisional Patent Application No.: 61/067,451, filed Feb. 28, 2008, the disclosure of which is incorporated by reference herein in its entirety.

TECHNICAL FIELD

The exemplary and non-limiting embodiments of this invention relate generally to wireless communication systems, methods, devices and computer programs and, more specifically, relate to multi-finger (RAKE) radio frequency receivers and methods for operating RAKE receivers.

BACKGROUND

Various abbreviations that appear in the specification and/or in the drawing figures are defined as follows:
MRC maximum ratio combining
SIR signal to interference ratio
HSDPA high speed downlink packet access
DPCH dedicated physical channel
DL downlink
QPSK quadrature phase shift keying
16-QAM 16-state quadrature amplitude modulation
CQI channel quality indicator
FDD frequency division duplex
TDD time division duplex
WCDMA wideband code division multiple access Exemplary Rake receiver embodiments can be found in commonly owned U.S. Pat. No. 6,215,814, Rake Receiver, Juha Ylitalo, Peter Muszynski, Esa Tiirola and Toni Neffling; U.S. Pat. No. 6,741,665 B2, Method and Apparatus Providing an Amplitude independent Automatic Frequency Control Circuit, Thomas J. Kenney and Jukka Tapaninen; and U.S. Pat. No. 7,245,652 B2, Rake Combiner for a CDMA Rake Receiver, Alice Wilson.

As is explained in U.S. Pat. No. 6,215,814, in a CDMA system a Rake receiver is used for separating multipath propagated signal components after reception. In general, the signal components are then separated from each other at least by using part of a spreading code (by a chip). The Rake receiver comprises Rake fingers where in each finger despreading and diversity combination take place. On the radio path the signal will also include, in addition to the desired signal, noise and interference caused by other users or systems. In systems utilizing diversity the influence of noise and interference can be decreased by using, for example, the MRC method.

In the conventional Rake receiver the combining of the multi-path signals can be accomplished by using different methods, in addition to the MRC method, such as by using equal gain combining and signal-to-interference ratio (SIR) combining. The end result is an indication of how multi-path signals are weighted before summing. Of these methods SIR combining is typically preferred since it gives the best performance. However, SIR combining is significantly more complex than other approaches, resulting in sub-optimal methods, such as MRC, being used for practical reasons.

One drawback to the use of MRC Rake is that under certain conditions it can result in performance that is less than what would be achieved where some of the multi-path signals are not combined at all (in the general case there should always be at least one received multi-path).

If a RAKE finger is allocated to a time instant where there in reality is no desired signal, the finger will add interference only to the combined signal, Therefore, in a typical MRC Rake implementation a so-called combining threshold is used to indicate the power value that a perceived or actual single multi-path signal has to exceed so that it will be combined in the MRC Rake receiver. This combining threshold value can be defined, for example, as a fixed offset from noise floor power (in general, a most typical case defines the combining threshold as a fixed value, rather than in relation to the strongest multi-path.)

In U.S. Pat. No. 7,283,578 B2, "System and Method to Adjust Searcher Threshold parameter of RAKE Receiver", Che-Li L Kin and Sheng-Jie Chen, an adjustable threshold is used in a searcher unit 122 of a Rake receiver.

SUMMARY

The foregoing and other problems are overcome, and other advantages are realized, by the use of the exemplary embodiments of this invention.

In a first aspect thereof the exemplary embodiments of this invention provide a method that comprises receiving a signal through a channel; considering at least one channel-related criterion and, in response to the considered at least one channel-related criterion, setting a value of an adaptive combining threshold for a maximum ratio combiner that receives the outputs of a plurality of fingers of a rake receiver.

In a further aspect thereof the exemplary embodiments of this invention provide a computer readable memory that stores program instructions, the execution of the program instructions resulting in operations that comprise considering at least one channel-related criterion, where the channel is one through which a signal is received and, in response to the considered at least one channel-related criterion, setting a value of an adaptive combining threshold for a maximum ratio combiner that receives the outputs of a plurality of fingers of a rake receiver.

In a further aspect thereof the exemplary embodiments of this invention provide an apparatus that comprises a multi-finger rake receiver. The multi-finger rake receiver comprises a unit configurable to adaptively set a combining threshold for a maximum ratio combiner based on at least one channel-related criterion.

DETAILED DESCRIPTION

Figure 1:
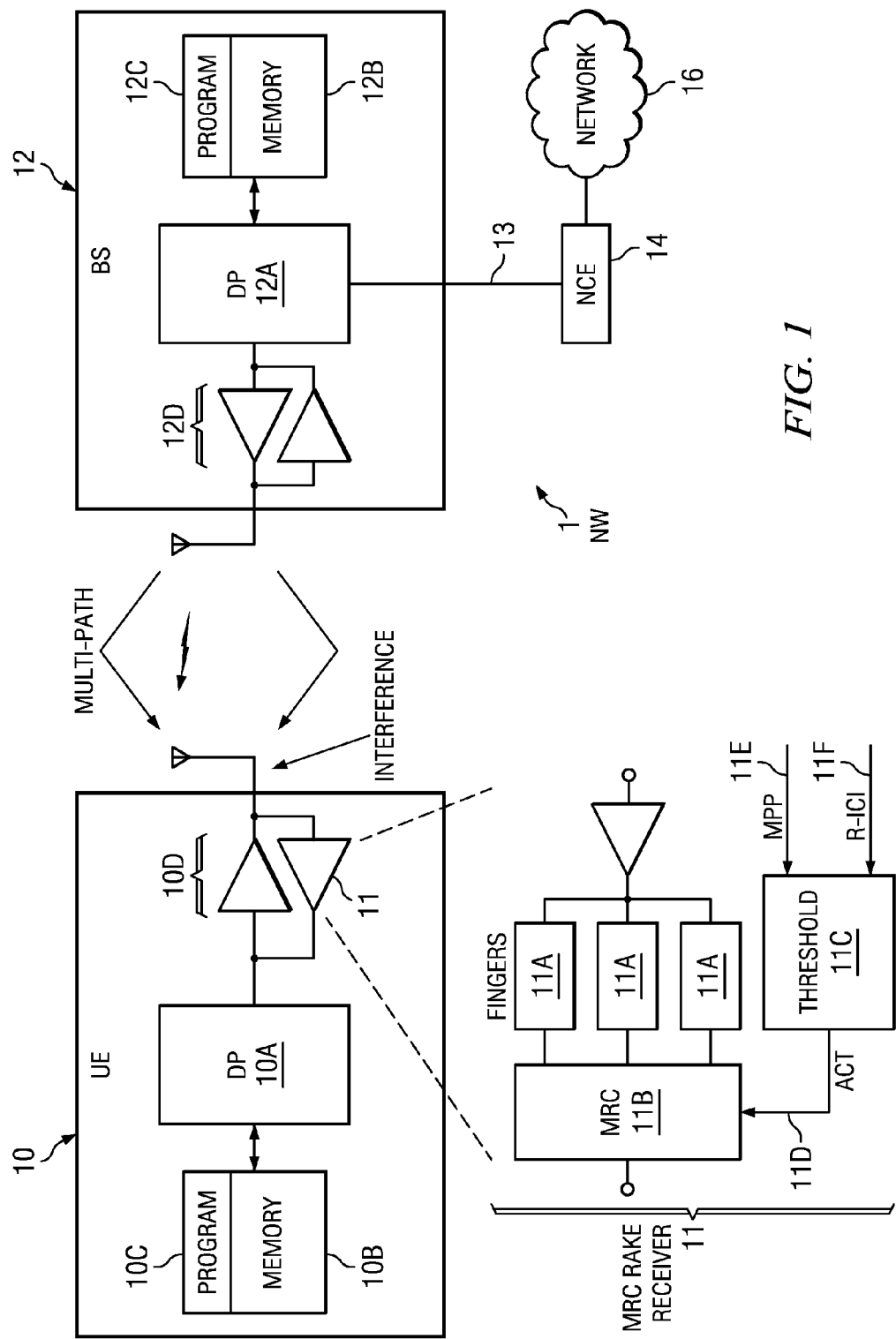
FIG. 1 shows a simplified block diagram of various electronic devices that are suitable for use in practicing the exemplary embodiments of this invention.

The exemplary embodiments of this invention provide methods and apparatus to adaptively vary the MRC threshold in a spread spectrum system, such as in a CDMA or a WCDMA system.

Reference may be made, for example, to 3GPP TS 25.211 V5.8.0 (2005-12) Technical Specification 3rd Generation Partnership Project; Technical Specification Group Radio Access Network; Physical channels and mapping of transport channels onto physical channels (FDD) (Release 5); 3GPP TS 25.212 V5.10.0 (2005-06) Technical Specification 3rd Generation Partnership Project; Technical Specification Group Radio Access Network; Multiplexing and channel coding (FDD) (Release 5); and 3GPP TS 25.213 V5.6.0 (2005-06) Technical Specification 3rd Generation Partnership Project; Technical Specification Group Radio Access Network; Spreading and modulation (FDD) (Release 5), each of which is incorporated by reference herein.

Reference can also be made, by example, to 3GPP TS 25.214 V5.11.0 (2005-06) Technical Specification 3rd Generation Partnership Project; Technical Specification Group Radio Access Network; Physical layer procedures (FDD) (Release 5) and to 3GPP TS 25.215 V5.7.0 (2005-06) Technical Specification 3rd Generation Partnership Project; Technical Specification Group Radio Access Network; Physical layer—Measurements (FDD) (Release 5), both of which are incorporated by reference herein.

Reference may also be made, for example, to 3GPP TS 25.221 V7.5.0 (2007-11) Technical Specification 3rd Generation Partnership Project; Technical Specification Group Radio Access Network; Physical channels and mapping of transport channels onto physical channels (TDD) (Release 7), incorporated by reference herein, as well as to 3GPP TS 25.222 V7.5.0 (2007-11) Technical Specification 3rd Generation Partnership Project; Technical Specification Group Radio Access Network; Multiplexing and channel coding (TDD) (Release 7); 3GPP TS 25.223 V7.6.0 (2007-11) Technical Specification 3rd Generation Partnership Project; Technical Specification Group Radio Access Network; Spreading and modulation (TDD) (Release 7); and 3GPP TS 25.224 V7.5.0 (2007-11) Technical Specification 3rd Generation Partnership Project; Technical Specification Group Radio Access Network; Physical layer procedures (TDD) (Release 7), each of which is incorporated by reference herein.

As considered herein, MRC refers to a case where the interference is assumed to be the same in all fingers, and consequently the combination weights are based on the multipath amplitude alone. In contrast, and as further considered herein, SIR combining does not assume that the interference is the same in all fingers and thus the combination weights are based on the individual SIR in each finger.

The use of the adaptive combining threshold increases the performance of the MRC Rake receiver with but a modest increase in receiver complexity. In this context increased performance implies, for example, an increased HSDPA throughput or, alternatively, that the receiver is able to receive a DPCH containing speech or some other data with a lower transmitted DPCH power at a base station antenna. The enhanced HSDPA throughput results in reduced download times for the end user, while the lower DPCH transmitter power results in the network experiencing an increase in capacity and thus an ability to simultaneously serve more users.

Reference is made to FIG. 1 for illustrating a simplified block diagram of various electronic devices that are suitable for use in practicing the exemplary embodiments of this invention. In FIG. 1 a wireless network (NW) 1 is adapted for communication with an apparatus 10, also referred to herein for convenience as a MS 10 or as a UE 10, via another apparatus, such as a network access node 12, also referred to herein for convenience as a BS 12 (or in some radio technologies as a Node B). The NW 1 may include a network control element (NCE) 14. The UE 10 includes a data processor (DP) 10A, a computer-readable memory (MEM) 10B that stores programs (PROG) 10C, and a suitable radio frequency (RF) transceiver 10D for bidirectional wireless communications with the BS 12. The BS 12 also includes a DP 12A, a MEM 12B that stores PROG 12C, and a suitable RF transceiver 12D. The BS 12 is coupled via a data path 13 to the NCE 14. At least the PROG 10C, and possibly also the PROG 12C, may be assumed to include program instructions that, when executed by the associated DP 10A (or 12A), enable the electronic device to operate in accordance with the exemplary embodiments of this invention, as will be discussed below in greater detail. The program 10C will also include various application programs, such as an email program, a web browser program, and other programs that are used by a user of the UE 10. Some of these application programs operate in conjunction with the radio interface via the transceiver 10D, and may send data to and/or receive data from a data communications network 16, such as the internet.

For the purposes of describing this invention the UE 10 is assumed to include a MRC Rake receiver 11 that comprises a plurality (e.g., three or more) correlators or fingers 11A, a MRC unit or block 11B and, in accordance with the exemplary embodiments of this invention, an adaptive combining threshold (ACT) 11D provided by a threshold unit or block 11C. The Rake receiver 11 processes a plurality of multi-path signals received from the transmitter of the BS 12 in conjunction with received interference, which can include inter-cell interference and intra-cell interference.

Typically there will be a plurality of UEs 10 serviced by the BS 12. The UEs 10 may or may not be identically constructed, but in general are all assumed to be electrically and logically compatible with the relevant network protocols and standards needed for operation in the wireless NW 1.

In general, the exemplary embodiments of this invention, including the MRC Rake receiver 11, may be implemented at least in part by computer program instructions/software executable by the DP 10A of the UE 10, or by hardware, or by a combination of software and hardware (and firmware).

The various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memories 10B, 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A may be of any type suitable to the local technical environment, and may include one or more of general purpose computers, special purpose computers, microprocessors, digital signal processors (DSPs) and processors based on multi-core processor architectures, as non-limiting examples.

In accordance with the embodiments of this invention in the MRC Rake receiver 11 the MRC combining threshold (ACT 11D) is changed adaptively based on the underlying reception environment, thus improving the performance of the MRC Rake receiver 11. It is an aspect of this invention that the ACT 11D may be changed rapidly, such as once in a time slot or sub-frame (e.g., every 2 ms). Thus, the UE 10 is enabled to adapt the MRC Rake receiver 11 to fast changes that may occur in the reception environment. The changes can occur in, for example, one or both of the number of multi-path signals that are received and the overall interference scenario.

In an exemplary and non-limiting embodiment of this invention the UE 10 changes the ACT 11D based on a received multi-path profile (MPP) 11E and on a ratio of intra-cell interference to inter-cell interference (R-ICI) 11F. In general, as the number of received multi-path signals increases the ACT 11D is changed to lower the MRC threshold, and as the ratio of intra-cell to inter-cell interference increases the ACT 11D is changed to increase the MRC threshold.

In general, the act of combining a finger adds both signal and interference. Therefore, the greater the total interference (either from other multi-paths, or from other cells, or from both) the additional interference from the additional finger will have less impact. Consequently, as the total interference increases the ACT 11D operates to lower the threshold, as in these cases the additional beneficial signal is more significant than the added interference.

Figure 2:
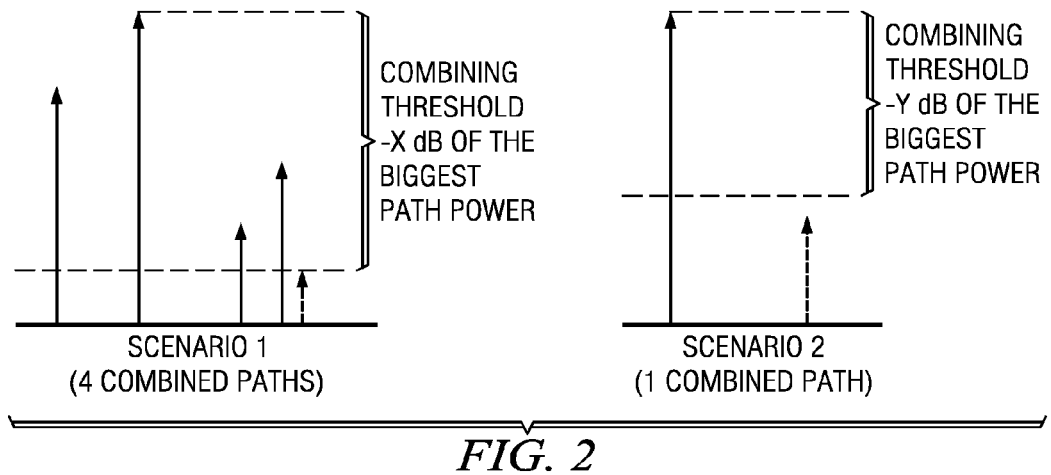
FIG. 2 presents a non-limiting example of how a combining threshold may change depending on a multi-path profile of a channel.

FIG. 2 presents a non-limiting example of how the ACT 11D may change depending on the multi-path profile of the channel. For example, in a first scenario the combining threshold is -X dB of the greatest path power, and there are then 4 combined paths, while in a second scenario the combining threshold is -Y dB of the greatest path power, and in this case there is but one combined path.

There are many possible techniques that may be used by the threshold block 11C to estimate the MPP 11E and the R-ICI 11F for changing the ACT 11D.

In one non-limiting example the ACT 11D is set based on a received modulation type, e.g., QPSK vs. 16-QAM, as the modulation type selected by the BS 12 indirectly reflects the multi-path and interference scenario at the time of reception. This is due at least to the fact that in good signal conditions the BS 12 can use 16-QAM, where "good signal conditions" may be considered to imply that there fewer multi-paths present that cause interference to one another and/or that the UE 10 is close to the BS 12 such that, for example, the intra-cell to inter-cell interference ratio is high. However, when the signal conditions are more demanding the BS 12 can switch to a more robust modulation method, such as QPSK, which can be received by the UE 10 with a lower signal-to-interference ratio than the (less robust) 16-QAM signal.

In another non-limiting example the ACT 11D is set based on CQI reports that UE 10 sends to NW 1. Such CQI reports are specified for use in 3GPP in various types of wireless standards and protocols, and the reported CQI value reflects the underlying multi-path conditions and interference scenarios.

In general, the higher the reported CQI the better the signal conditions are. Typically the BS 12 utilizes CQI reports for its scheduling algorithm(s). For example, the higher the reported CQI the larger a transport block size can be (and a more demanding modulation method can be used) to transmit data from the BS 12 to the UE 10. As a non-limiting example, in a 3GPP system when the UE 10 reports a CQI value of 15 or lower the network may begin to use the more robust QPSK modulation, while if the CQI value is greater than 15 then some networks may begin to use 16QAM.

In another non-limiting example the ACT 11D is set based on the signal to noise ratio (SNR), or on the signal-to-interference ratio (SIR), of the strongest finger 11A, and based on this value the threshold block 11C may estimate the underlying multi-path profile and interference scenario and adjust the value of the ACT 11D accordingly. In general, either the SNR or the SIR may be used, however there may be a preference to use the SIR. This is true at least for the reason that N typically refers to thermal noise, while in CDMA systems the interference from multi-paths and/or from inter-cells dominate, as compared to the thermal noise, resulting in the SIR providing (typically) a more useful metric for setting the ACT 11D.

It is also within the scope of the invention that the ACT 11D is set based on two or more of the foregoing criteria alone, or in combination with another one or more criteria indicative of the underlying multi-path profile and interference scenario.

Depending on the selected combining threshold criterion or criteria the rate of changing the ACT 11D can be selected accordingly. For example, when the criterion is based on modulation type and/or CQI then the ACT 11D may be changed at a sub-frame (e.g., 2 ms) or lower rate. On the other hand when using the SIR of the strongest multi-path then the rate of changing the threshold value may be once per timeslot (or lower).

It is also with thin the scope of the invention to change the ACT 11D at an even lower rate, such as once per frame (e.g., 10 ms). In this case, and to achieve a most reliable decision of the optimum value of the ACT 11D, the decision criterion or criteria (e.g., SIR and/or CQI) values may be filtered (e.g., averaged) over some period of time, such as 10 ms. For example, the SIR and/or CQI values obtained per sub-frame may be averaged over a plurality of sub-frames (e.g., five) to make the ACT 11D decision.

There are a number of advantages and technical effects made possible by the use of these exemplary embodiments. For example, enhanced performance is achieved, such as higher HSDPA throughput and/or lower required DL DPCH power, resulting in increased network capacity. As another example, the increase in complexity to implement the MRC Rake receiver 11 is still less than that required to implement a SIR Rake receiver.

A further advantage and technical effect relates to the actual location of the adaptive threshold unit 11C and to where the ACT threshold 11D is applied. For example, in the U.S. Pat. No. 7,283,578 B2 that was mentioned above the adaptive threshold is used in the searcher, while in the exemplary embodiments of this invention the adaptive threshold is used in the MRC Rake receiver. One disadvantage to placing the adaptive threshold in the searcher is that it cannot be updated as rapidly as when it is located in the MRC Rake receiver. For example, when the threshold is placed in the MRC Rake receiver 11 in accordance with the exemplary embodiments of this invention it may be changed, if desired, in every time slot (e.g., 1500 times per second). In the exemplary embodiments of this invention the searcher threshold may be fixed (i.e., not adjustable), and it may be set to a rather low level. In this case it is the responsibility of the MRC Rake receiver 11 to determine which multi-paths are combined, and this determination can be made, if desired, on a slot-by-slot basis. Alternatively, and if filtering is being used on any of the criteria described herein, the adaptive threshold (ACT 11D) can be changed at a lower rate.

A still further advantage and technical effect that is realized by the use of these exemplary embodiments relates to an ability to enhance operation of the UE 10 with a BS 12 that uses at least two different types of modulation, such as in the HSDPA system where the BS 12 uses QPSK or 16-QAM, and where the UE 10 reports CQI values to the NW 1. The ability to adaptively change the threshold of the MRC Rake receiver 11 in this type of environment is particularly useful and advantageous.

Based on the foregoing it should be apparent that the exemplary embodiments of this invention provide a method, apparatus and computer program product(s) to improve the performance of a MRC-based Rake receiver.

Figure 3:
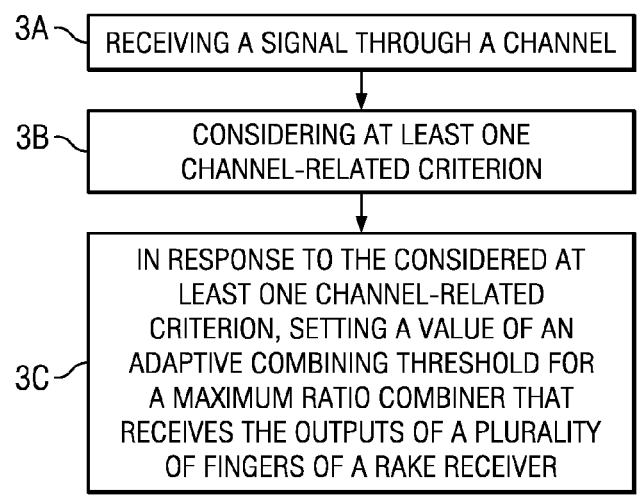
FIG. 3 is a logic flow diagram that illustrates the operation of a method, and a result of execution of computer program instructions, in accordance with the exemplary embodiments of this invention.

Referring to FIG. 3 there is illustrated a logic flow diagram that depicts the operation of a method, and a result of execution of computer program instructions, in accordance with the exemplary embodiments of this invention. At Block 3A there is a step of receiving a signal, such as a CDMA signal, through a channel; at Block 3B there is a step of considering at least one channel-related criterion; and at Block 3C, in response to the considered at least one channel-related criterion, a step of setting a value of an adaptive combining threshold for a maximum ratio combiner that receives the outputs of a plurality of fingers of a Rake receiver.

The method as in the preceding paragraph, where the considered at least one channel-related criterion is indicative of a received multi-path profile.

The method as in the preceding paragraph, where the considered at least one channel-related criterion is indicative of a ratio of intra-cell interference to inter-cell interference.

The method as in the preceding paragraphs, where the considered at least one channel-related criterion is comprised of a type of modulation used in the received signal.

The method as in the preceding paragraphs, where the considered at least one channel-related criterion is one related to or based on a channel quality indicator.

The method as in the preceding paragraphs, where the considered at least one channel-related criterion is comprised of at least one of a SNR and a SIR of a strongest finger.

The method as in the preceding paragraphs, wherein the step of setting occurs at a sub-frame rate or lower of the received signal.

The method as in the preceding paragraphs, wherein the step of setting occurs at a frame rate or lower of the received signal.

The method as in the preceding paragraphs, wherein the step of setting occurs at a time slot rate or lower of the received signal.

The method as in the preceding paragraphs, wherein the step of considering at least one channel-related criterion includes a step of filtering the at least one criterion over a period of time.

The various blocks shown in FIG. 3 may be viewed as method steps, and/or as operations that result from operation of computer program code, and/or as a plurality of coupled circuit elements constructed to carry out the associated function(s).

The exemplary embodiments of this invention also pertain to apparatus, which may be embodied in an integrated circuit or module, and that comprises a multi-finger MRC Rake receiver having block configurable for adaptively setting a combining threshold for the MRC based on at least one channel-related criterion.

The exemplary embodiments of this invention further pertain to an apparatus, which may be embodied in an integrated circuit or module, and that comprises means for receiving a CDMA signal through a channel; means for considering at least one channel-related criterion; and means, in responsive to the considered at least one channel-related criterion, for setting a value of an adaptive combining threshold for a maximum ratio combiner that receives the outputs of a plurality of fingers of a Rake receiver.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, it should be noted that these exemplary embodiments may be used in a WCDMA system, or in any other code division system where a MRC Rake receiver can be deployed. The exemplary embodiments may be deployed to advantage also in ultra-wideband (UWB) receivers. The exemplary embodiments also may be deployed to advantage in the receiver of the BS 12. The exemplary embodiments may be used in FDD systems and in TDD systems, as non-limiting examples.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising: receiving, in a rake receiver, a signal through a channel; considering at least one channel-related criterion; and in response to the considered at least one channel-related criterion, setting a value of an adaptive combining threshold for a maximal ratio combiner that receives the outputs of a plurality of fingers of the rake receiver; wherein the considered at least one channel-related criterion is indicative of a ratio of intra-cell interference to inter-cell interference; and wherein the value of the adaptive combining threshold is set based upon at least one of: a signal to noise ratio (SNR), or a signal to interference ratio (SIR); of a strongest finger of the plurality of fingers of the rake receiver.

2. The method as in claim 1, where the considered at least one channel-related criterion is indicative of a received multi-path profile.

3. The method as in claim 1, where the considered at least one channel-related criterion is comprised of a type of modulation used in the received signal.

4. The method as in claim 1, where the considered at least one channel-related criterion is one related to a channel quality indicator.

5. The method as in claim 1, where setting occurs at a frame rate or a sub-frame rate, or lower that the frame rate or sub-frame rate of the received signal.

6. The method as in claim 1, where setting occurs at a time slot rate, or lower that the time slot rate, of the received signal.

7. The method as in claim 1, where considering at least one channel-related criterion comprises filtering the at least one criterion over a period of time.

8. The method of claim 1, where the received signal is a code division multiple access signal, and where the method is executed in at least one of a mobile wireless frequency communication device and a wireless network access node.

9. A non-transitory computer readable memory that stores program instructions, the execution of the program instructions resulting in operations that comprise: considering at least one channel-related criterion, where the channel is one through which a signal is received at a rake receiver; and in response to the considered at least one channel-related criterion, setting a value of an adaptive combining threshold for a maximal ratio combiner that receives the outputs of a plurality of fingers of the rake receiver; wherein the considered at least one channel-related criterion is indicative of a ratio of intra-cell interference to inter-cell interference; and wherein the value of the adaptive combining threshold is set based upon at least one of: a signal to noise ratio (SNR), or a signal to interference ratio (SIR); of a strongest finger of the plurality of fingers of the rake receiver.

10. The memory as in claim 9, where the considered at least one channel-related criterion is indicative of or related to at least one of a received multi-path profile, a type of modulation used in the received signal, a channel quality indicator a signal to noise ratio and a signal to interference ratio of the strongest finger.

11. The memory as in claim 9, where the operation of setting occurs at a frame rate or a sub-frame rate, or lower that the frame rate or sub-frame rate of the received signal.

12. The memory as in claim 9, where the operation of setting occurs at a time slot rate, or lower than the time slot rate, of the received signal.

13. The memory as in claim 9, where the operation of considering at least one channel-related criterion comprises filtering the at least one criterion over a period of time.

14. An apparatus, comprising: a multi-finger rake receiver for receiving a signal through a channel, including a unit configurable to adaptively set a combining threshold for a maximal ratio combiner that receives a plurality of outputs of the multi-finger rake receiver, based on at least one channel-related criterion that is indicative of a ratio of intra-cell interference to inter-cell interference, and wherein the value of the adaptive combining threshold is set based upon at least one of: a signal to noise ratio (SNR), or a signal to interference ratio (SIR); of a strongest finger of the multi finger rake receiver.

15. The apparatus as in claim 14, where the at least one channel-related criterion is further indicative of or related to at least one of a received multi-path profile, a type of modulation used in the received signal, a channel quality indicator a signal to noise ratio and a signal to interference ratio of the strongest finger.

16. The apparatus as in claim 14, where said unit is further configurable to set the combining threshold a frame rate or a sub-frame rate, or lower that the frame rate or sub-frame rate of the received signal, or at a time slot rate, or lower that the time slot rate, of the received signal.

17. The apparatus as in claim 14, where said unit is further configurable to filter the at least one channel-related criterion over a period of time.

18. The apparatus as in claim 14, embodied at least partially in at least one integrated circuit.

\* \* \* \* \*